US011931743B2

(12) United States Patent
Gaeta et al.

(10) Patent No.: US 11,931,743 B2
(45) Date of Patent: Mar. 19, 2024

(54) METHOD AND APPARATUS FOR SHREDDING COOLING TOWER DEBRIS

(71) Applicant: AmertechTowerServices, LLC., Shrewsbury, NJ (US)

(72) Inventors: Mark Gaeta, Lincroft, NJ (US); Henry Free, Tampa, FL (US)

(73) Assignee: AMERTECHTOWERSERVICES, LLC, Shrewsbury, NJ (US)

(*) Notice: Subject to any disclaimer, the term of this patent is extended or adjusted under 35 U.S.C. 154(b) by 381 days.

(21) Appl. No.: 17/179,733

(22) Filed: Feb. 19, 2021

(65) Prior Publication Data

US 2022/0266255 A1 Aug. 25, 2022

(51) Int. Cl.

| | |
|---|---|
| ***B02C 18/00*** | (2006.01) |
| ***B02C 18/14*** | (2006.01) |
| ***B02C 18/22*** | (2006.01) |
| ***B02C 23/20*** | (2006.01) |
| ***F28F 99/00*** | (2006.01) |

(52) U.S. Cl.
CPC ........ *B02C 18/0084* (2013.01); *B02C 18/142* (2013.01); *B02C 18/2216* (2013.01); *B02C 23/20* (2013.01); *F28F 99/00* (2013.01)

(58) Field of Classification Search
CPC .............. B02C 18/0084; B02C 18/142; B02C 18/2216; B02C 23/20; B02C 18/14; B02C 18/18; F28F 99/00
USPC ........................................................... 241/15
See application file for complete search history.

(56) References Cited

U.S. PATENT DOCUMENTS 3,981,455 A * 9/1976 Kaczmarek ......... B02C 18/0084 241/DIG. 38
3,994,770 A * 11/1976 Lausch .................... D21B 1/32 209/163
4,180,004 A * 12/1979 Johnson .................... F23G 5/50 44/605
4,423,844 A * 1/1984 Sours .................. B02C 18/0084 241/35
4,529,134 A * 7/1985 Williams ................ B02C 18/24 241/35
5,248,100 A * 9/1993 Arakawa ............... B02C 18/142 241/34
5,431,347 A * 7/1995 Hayashi .................... B03B 5/28 241/23

(Continued)

FOREIGN PATENT DOCUMENTS

DE 3521586 * 8/1986
KR 20170029069 * 9/2015

OTHER PUBLICATIONS

DE3521586 MT (Year: 1986).*

(Continued)

*Primary Examiner* — Adam J Eiseman
*Assistant Examiner* — Fred C Hammers
(74) *Attorney, Agent, or Firm* — Moser Taboada

(57) ABSTRACT

Methods and apparatus for shredding cooling tower debris are provided herein. In some embodiments, a method of preparing debris for disposal includes: receiving debris from a cooling tower; processing the received debris through a low RPM shredder to reduce the size of the debris; depositing the reduced size debris onto a conveyor; and moving the debris along the conveyor and depositing the debris into a receptacle.

20 Claims, 2 Drawing Sheets

(56) References Cited

U.S. PATENT DOCUMENTS

| | | | | |
|---|---|---|---|---|
| 2004/0159729 | A1* | 8/2004 | Strong | B02C 18/182<br>241/236 |
| 2009/0118563 | A1* | 5/2009 | Timmons | B09B 3/0066<br>588/314 |
| 2012/0018555 | A1* | 1/2012 | Schiffer | B02C 18/2233<br>241/101.2 |
| 2020/0306764 | A1* | 10/2020 | Lindner | B02C 18/2291 |
| 2020/0391412 | A1* | 12/2020 | Hodgson | B02C 18/0092 |
| 2021/0001347 | A1* | 1/2021 | Lucas | B65B 69/0058 |

OTHER PUBLICATIONS

KR20170029069 MT (Year: 2015).*
Komplet, Krokodile Technical Specification, www.komplet.it, 16 pages.
SSI Shredders, Waste Shredding: Bulky Waste & Mixed C&D (P), https://www.youtube.com/watch?v=r_k3Ox3nOo, Sep. 24, 2015, video.
Morbark, LLC, Morbark HT1042 Shredder—Minimizing Construction / Demolition Waste (C & D). https://www.youtube.com/watch?v=oijqaiWkByto, Mar. 13, 2017, video.
BCA Industries, Aug. 28, 2020, 3 pages, Industrial Shredders and Recycling Equipment, Milwaukee, WI.

* cited by examiner

METHOD AND APPARATUS FOR SHREDDING COOLING TOWER DEBRIS

FIELD

Embodiments of the present disclosure generally relate to demolition debris disposal, and more specifically to a method for shredding cooling tower debris.

BACKGROUND

Cooling towers are used to dispose of unwanted heat, for example, in the production of electricity or in various industrial processes. The cooling towers have a primary heat transfer section that uses a special type of heat exchanger that allows water and air to come into contact with each other to lower the temperature of the water. The primary heat transfer section uses a material called fill, also sometimes referred to as packing, filling, or baffles, is the heart of a cooling tower. During the heat transfer process, small volumes of water evaporate, lowering the temperature of the water that is being circulated throughout the cooling tower. The fill material in the primary heat transfer section is typically made from a plastic material, such as high-density polyethylene (HDPE) or polyvinyl chloride (PVC). Cooling tower performance degrades over time as the condition of the cooling tower fill material deteriorates, no longer providing the greatest possible heat transfer surface. In addition, over time, the fill accumulates debris from mud, wood, plastics, metal, and other foreign debris. Thus, over time, the fill may need to be repaired or replaced. When the fill is removed from the cooling tower it is typically disposed of as-is in bulky and rigid pieces in an appropriate landfill. As the material has a low density, disposal volume is relatively high unless an effort is made to reduce the volume of the material removed from the cooling tower. In some cases, the material is disposed of without volume reduction and in other cases various efforts are made to reduce the volume. With techniques employed as described herein, volume reductions of approximately 75% can be achieved.

The inventors have attempted to reduce the volume of the cooling tower fill and other materials to more efficiently dispose of the materials. One such method to reduce the volume of the fill uses a high revolution per minute (RPM) system, such as a woodchipper, to chip the fill of the cooling tower into smaller pieces. These high RPM machines operate at rotational speeds at or above 1000 RPM, including 2000 RPM or higher. However, the inventor has observed that such high RPM machines often get jammed and/or, due to the blade configuration, the blades break or wear quickly, resulting in costly repairs to the shredder. In addition, the inventor has observed that such apparatus often creates a dust plume of fine particulate of the chipped materials that needs to be cleaned and may possibly be a health hazard for workers that may breathe in the particulate as well as possible failure to comply with emissions regulations.

Therefore, the inventors have provided improved methods of shredding cooling tower debris, such as cooling tower fill material or other materials.

SUMMARY

Methods and apparatus for shredding cooling tower debris are provided herein. In some embodiments, a method of preparing debris for disposal includes: receiving debris from a cooling tower; processing the received debris through a low RPM shredder to reduce the size of the debris; depositing the reduced size debris onto a conveyor; and moving the debris along the conveyor and depositing the debris into a receptacle.

In some embodiments, a method of preparing cooling tower debris for disposal includes: removing debris from a cooling tower; depositing the debris into a load hopper of a low RPM shredder; processing the received debris through the low RPM shredder to reduce the size of the debris; depositing the reduced size debris onto a conveyor; and moving the debris along the conveyor and depositing the debris into a portable dumpster.

In some embodiments, an apparatus for shredding cooling tower debris, comprising: a feed hopper for depositing cooling tower debris; a body coupled to the feed hopper and having a plurality of hook knives configured to shred the cooling tower debris as it passes through the plurality of hook knives; a conveyor configured to receive shredded cooling tower debris exiting the body and to move the shredded cooling tower debris toward a receptacle for disposal; and a liquid dispenser configured to spray liquid onto shredded cooling tower debris to reduce the amount of dust emitted into the air. The cooling tower debris can comprise cooling tower fill material, drift eliminators, or other cooling tower materials being disposed of.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1:
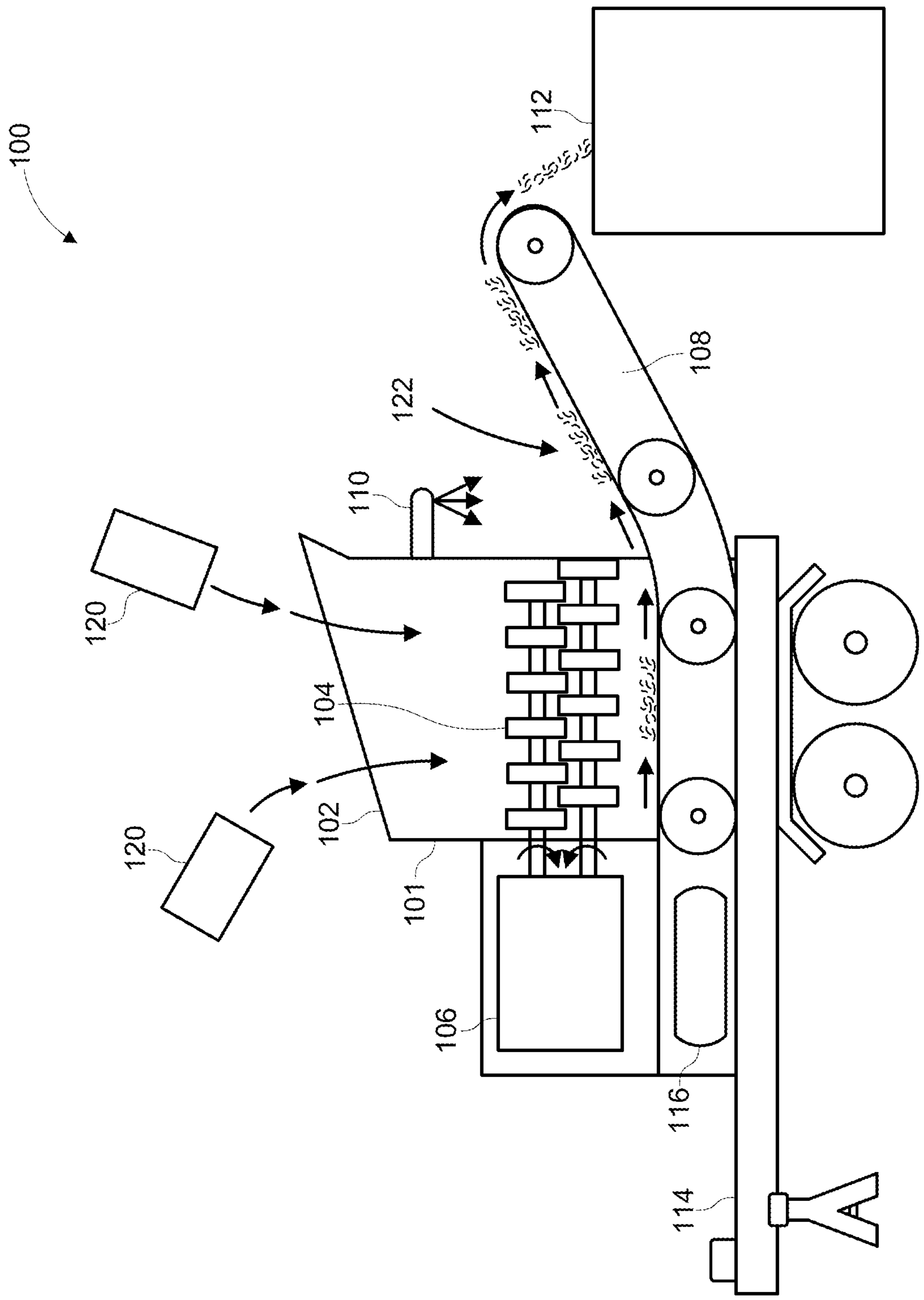
FIG. 1 is a side view of an apparatus for shredding cooling tower debris, according to one or more embodiments of the present invention.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of a method for shredding cooling tower debris are provided herein. Cooling towers are made from specialized materials including plastics, high density polyethylene (HDPE), polyvinyl chloride (PVC), fiberglass, wood, and the like. During the construction, repair, or decommission of a cooling tower, waste amounts of this specialized material, in particular from cooling tower fill (or just fill), drift eliminators, etc., need to be disposed of. Since the debris, such as the fill material, is bulky and rigid, disposal volumes are large and can be reduced by various methods including shredding. In accordance with embodiments of the present invention, apparatus and techniques for shredding the fill material are provided so that the fill material can be more efficiently disposed of.

In some embodiments, the cooling tower debris is shredded in a high-torque, low revolution per minute (RPM) shredder having large robust hook knives that are resistant to clogging, bending, or breakage due to processing of the material, as compared to the blades of a conventional chipper (which is a low-torque, high RPM apparatus). FIG. 1 is a diagram of an apparatus 100 suitable for performing the method for shredding cooling tower debris in accordance with embodiments of the present disclosure. In some embodiments, the apparatus 100 may be portable, such as disposed on a trailer 114 suitable for supporting and transporting the apparatus 100 to and from a desired location, such as a job site.

The apparatus 100 comprises a body 101 enclosing a plurality of hook knives 104. The hook knives can be made of any suitable material, such as steel. The hook knives 104 are arranged in a pair of rows each having subset of the plurality of hook knives disposed along each respective row in an alternatingly interleaved manner. For example, the hook knives are disposed along a pair of parallel shafts that can be rotated in opposite directions. The cooling tower debris material can be passed through the plurality of hook knives to shred, or reduce the debris to small particles (e.g., having an average size of about 0.5 to about 1.5 inches in width).

The body 101 includes a feed hopper 102 providing an inlet to the plurality of hook knives 104. Waste material 120 (e.g., the cooling tower debris, such as fill, drift eliminators, etc.) can be inserted into the feed hopper 102 to be directed to and shredded by the plurality of hook knives 104 (as indicated by shredded material 122).

A motor 106 is disposed within the body 101 and is coupled to the plurality of hook knives to rotate the plurality of hook knives. The motor rotates each row in a direction counter to each other and toward each other from the inlet or feed hopper 102 side. Advantageously, the motor is configured to rotate the plurality of hook knives at a low rotational speed (i.e., a low RPM). In some embodiments, a low RPM is below about 30 RPM, such as between about 10 and about 20 RPM, and in one particular example, about 14 RPM. Further, the motor is configured to provide a high torque, such as about 25,000 to about 35,000, or in some embodiments, about 30,000, foot pounds of torque measured at the ends of the hook knives. In some embodiments, the motor can also be configured to rotate the shafts supporting the hook knives a slightly different rotational speeds to effectively shred and break frangible materials and create a better shear action. Advantageously, the blade configuration and slow rotational speed makes the reduction process more reliable. The low rotational speed of the hook knives keeps the debris in the machine and reduces the amount of particulate formation and/or dust emission, while spraying of liquid on the reduced size debris can further reduce the amount of dust released into the air before the reduced size debris is deposited in the dumpster. In addition, the larger blade size, as compared to the blade sizes used in conventional woodchipper-type shredding apparatus typically used to shred cooling tower materials, advantageously is more robust and provides more uptime and fewer repairs. To the contrary, conventional chipping apparatus operate at high RPM as noted above, such as about 1000 to 2000 RPM or higher. The inventors have observed that such high RPM machines undesirably wear and break down more quickly and propel dust and debris into the immediate atmosphere.

The shredded debris then exits the body of the shredder and is deposited on a conveyor to be conveyed to a suitable receptacle. For example, a conveyor 108 can be coupled to the body 101 on an outlet side of the plurality of hook knives 104 to transport the shredded materials away from the plurality of hook knives and to a receptacle 112 during use. The receptacle can be any suitable receptable such as a dumpster or portable dumpster.

Although the low RPM shredder reduces the amount of dust and debris expelled by the apparatus as compared to high RPM chippers, in some embodiments, the shredded debris can be sprayed with a liquid, such as water, to further suppress dust formation and spread of particulate matter created during the shredding process. For example, a liquid dispenser 110, such as a nozzle that can be coupled to a liquid source, can be provided and configured to spray liquid, such as water, onto the shredded debris as it passes along the conveyor 108. The liquid can also or alternatively be sprayed on the rotating knives, within the hopper, or any other location or combination of locations to mitigate the spread of dust or particulate from the shredding process. Liquid can be provided to the liquid dispenser 110 from a source of liquid on site, such as from a spigot or hose located on site, or from a liquid source 116. The liquid source 116 can include reservoir and a pump coupled to the liquid dispenser 110 via a hose or conduit to provide the liquid to the liquid dispenser 110.

Figure 2:
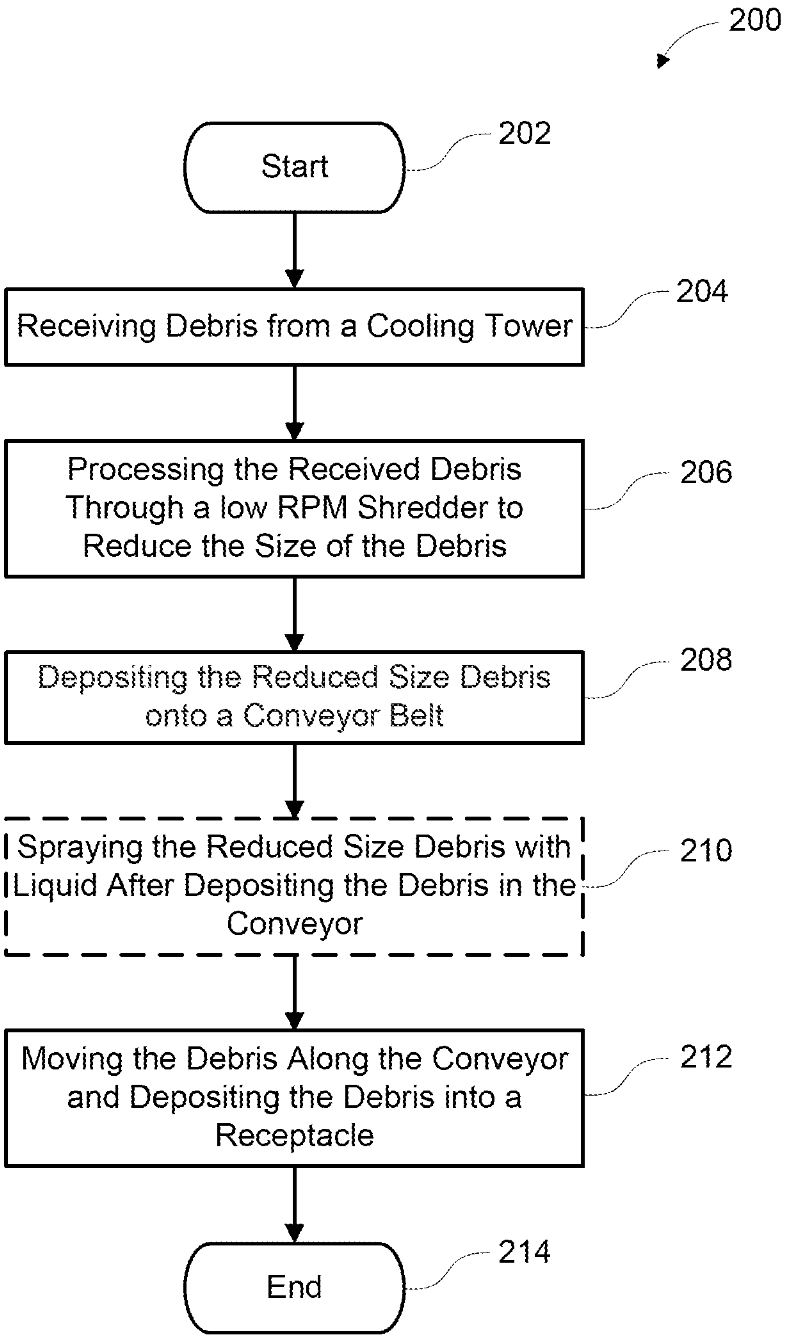
FIG. 2 is a flow diagram of a method for shredding cooling tower debris, according to one or more embodiments of the present invention.

FIG. 2 is a flow diagram of a method 200 for shredding cooling tower debris, including fill material, drift eliminators, and the like, according to one or more embodiments of the present invention. The method 200 begins at step 202 and proceeds to step 204.

At step 204, waste debris (or just debris) is received from a cooling tower. The debris can include cooling tower fill material or drift eliminators, comprising materials such as, for example, plastic, polypropylene, polyvinyl chloride (PVC), and other material from the cooling tower. Due to the nature of the use of the cooling tower, the debris may include dirt and fines, that may also include toxic particles. In addition, the debris may include other debris such as hammers, wood, plastic, and the like that has become embedded in the fill over the course of years. The debris, including drift eliminators, cooling tower fill, etc., can be obtained, for example, from cooling tower construction, maintenance, repair, or demolition activities. In particular, when maintaining cooling towers, used fill material is often replaced with new fill material and the used fill material must be disposed of.

At step 206, the received debris is processed (e.g., shredded) through a low rpm shredder to reduce the size of the debris. For example, the debris, including fill from a cooling tower and/or drift eliminators, is deposited into a feed hopper, such as the feed hopper 102 of the apparatus 100 discussed above.

The feed hopper directs the fill to a plurality of hook knives (e.g., plurality of hook knives 104) and the fill is reduced in size by passing through the plurality hook knives (e.g., the fill is shredded by the plurality of hook knives). The hook knives are rotated at a slow rotational speed, such as less than about 30 RPM or between about 10 and about 20 RPM. Individual hook knives of the plurality of hook knives may have a widths of about 1.5 to about 2.5 inches, or in some embodiments, about 2 inches. The plurality of hook knives are configured to shred the fill to an average size of less than about 3 inches, for example having a variable length averaging about 2 inches.

At step 208, the shredded, or reduced fill exits the plurality of hook knives and is deposited onto a conveyor (e.g., conveyor 108) that directs the shredded fill away from the plurality of hook knives. The fill travels from the exit of the plurality of hook knives along the conveyor, where optionally at step 210, the reduced fill is wet with a liquid, such as water, in order to reduce the amount of dust generated by the shredding of the fill material.

At step 212, the shredded fill is moved along the conveyor and deposited into a receptacle, such as a dumpster or portable dumpster (e.g., 112). The method 200 ends at step 214. The method 200 can continue for example, until all fill material is shredded. In some embodiments, where the amount of fill material exceeds the capacity of a single receptacle, the receptacle can be emptied and/or replaced, with or without pausing the shredding operation, in order to receive additional shredded fill material.

While the foregoing is directed to embodiments of the present disclosure, other and further embodiments of the disclosure may be devised without departing from the basic scope thereof.

The invention claimed is:

1. A method of preparing debris for disposal, comprising:

receiving debris from a cooling tower;

processing the received debris through a low RPM shredder having a rotation speed of less than about 30 RPM and torque of greater than about 25,000 foot-pounds to reduce the size of the debris;

depositing the reduced size debris onto a conveyor; and moving the debris along the conveyor and depositing the debris into a receptacle.

2. The method of claim 1, wherein the received debris comprises at least cooling tower fill material.

3. The method of claim 1, wherein processing the received debris comprises passing the received debris through a plurality of hook knives configured to shred the debris.

4. The method of claim 3, wherein the plurality of hook knives are configured in at least two rows.

5. The method of claim 3, wherein the plurality of hook knives are about 0.5" to about 2" wide.

6. The method of claim 3, wherein the plurality of hook knives are provided in two parallel rows, with the hook knives on one row alternatingly interleaved with hook knives on the other row.

7. The method of claim 1, wherein the debris is received at a first location, and further comprising:

rolling the low RPM shredder and the conveyer on wheels to a second location without disassembling the low RPM shredder and the conveyer.

8. The method of claim 3, wherein the plurality of hook knives rotate at about 10 to about 20 RPM.

9. The method of claim 1, further comprising spraying all of the reduced size debris with liquid after depositing the reduced size debris on the conveyor.

10. The method of claim 1, wherein the receptacle is a portable dumpster.

11. A method of preparing cooling tower debris for disposal, comprising:

removing debris from a cooling tower;

depositing the debris into a load hopper of a low RPM shredder;

processing the received debris through the low RPM shredder at a rotation speed of less than about 30 RPM and torque of greater than about 25,000 foot-pounds to reduce the size of the debris;

depositing the reduced size debris onto a conveyor; and moving the debris along the conveyor and depositing the debris into a portable dumpster.

12. The method of claim 11, wherein the debris comprises at least cooling tower fill material.

13. The method of claim 11, wherein the debris comprises at least one of high density polyethylene or polyvinyl chloride.

14. The method of claim 11, further comprising spraying all of the reduced size debris with liquid after depositing the debris on the conveyor.

15. The method of claim 11, wherein the load hopper, the low RPM shredder, and the conveyor are disposed on a portable apparatus with wheels.

16. The method of claim 11, further comprising rolling the low RPM shredder to a desired location after processing the received debris.

17. An apparatus for shredding cooling tower debris, comprising:

a feed hopper for depositing cooling tower debris through a top inlet of the feed hopper;

a body coupled to the feed hopper and having a plurality of hook knives configured to shred the cooling tower debris at a rotation speed of less than about 30 RPM and torque of greater than about 25,000 foot-pounds as it passes through the plurality of hook knives;

a conveyor configured to receive shredded cooling tower debris exiting the body and to move the shredded cooling tower debris toward a receptacle for disposal; and a liquid dispenser configured to spray liquid onto shredded cooling tower debris to reduce the amount of dust emitted into the air.

18. The apparatus of claim 17, wherein a nozzle of the liquid dispenser is disposed outside of the body.

19. The apparatus of claim 17, wherein the apparatus is portable.

20. The apparatus of claim 19, wherein the apparatus further comprises a trailer having wheels, wherein the feed hopper, the body, the conveyor, and the liquid dispenser are disposed on the trailer.

* * * * *